(12) United States Patent
Kainuma et al.

(10) Patent No.: US 9,719,848 B2
(45) Date of Patent: Aug. 1, 2017

(54) OPTICAL MODULE, METHOD FOR MANUFACTURING OPTICAL MODULE, AND OPTICAL TRANSCEIVER

(71) Applicant: FUJITSU LIMITED, Kawasaki-shi, Kanagawa (JP)

(72) Inventors: Norio Kainuma, Nagano (JP); Takashi Kubota, Chikuma (JP)

(73) Assignee: FUJITSU LIMITED, Kawasaki (JP)

(*) Notice: Subject to any disclaimer, the term of this patent is extended or adjusted under 35 U.S.C. 154(b) by 78 days.

(21) Appl. No.: 14/553,478

(22) Filed: Nov. 25, 2014

(65) Prior Publication Data
US 2015/0212285 A1    Jul. 30, 2015

(30) Foreign Application Priority Data
Jan. 28, 2014   (JP) ................. 2014-013773

(51) Int. Cl.
G02B 6/12    (2006.01)
G01J 1/04    (2006.01)
G02B 6/42    (2006.01)
G01J 1/02    (2006.01)

(52) U.S. Cl.
CPC .......... *G01J 1/0407* (2013.01); *G01J 1/0204* (2013.01); *G01J 1/0252* (2013.01); *G01J 1/0411* (2013.01); *G01J 1/0414* (2013.01); *G02B 6/4204* (2013.01); *G02B 6/428* (2013.01); *G02B 6/4212* (2013.01); *G02B 6/4214* (2013.01)

(58) Field of Classification Search
CPC ........................................................ G02B 6/42
USPC ........................................................ 385/14
See application file for complete search history.

(56) References Cited

U.S. PATENT DOCUMENTS

2011/0194820 A1* 8/2011 Sakurai ............... G02B 6/4201
                                                    385/88
2013/0182997 A1* 7/2013 Fujiwara ............ G02B 6/12004
                                                    385/14

FOREIGN PATENT DOCUMENTS

JP          4-354385    12/1992
JP          2006-215288  8/2006

* cited by examiner

*Primary Examiner* — Thanh Luu
(74) *Attorney, Agent, or Firm* — Staas & Halsey LLP

(57) ABSTRACT

An optical module comprising: an optical waveguide transports light, the optical waveguide including a first mirror which reflects first light; an adhesive sheet formed over the optical waveguide, the adhesive sheet including a first gap above the first mirror; a first light-transmissive layer formed in the first gap; a lens sheet arranged over the adhesive sheet, the lens sheet including a first lens which is formed above the first light-transmissive layer; and a light-emitting device formed above the lens sheet, the light-emitting device including a light-emitting portion which emits the first light to the first lens.

9 Claims, 15 Drawing Sheets

FIG. 5
(1) ATTACH ADHESIVE SHEET TO WAVEGUIDE MEMBER
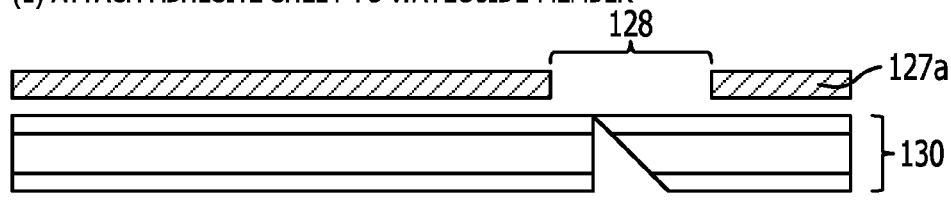
⇩
(2) BOND LENS SHEET
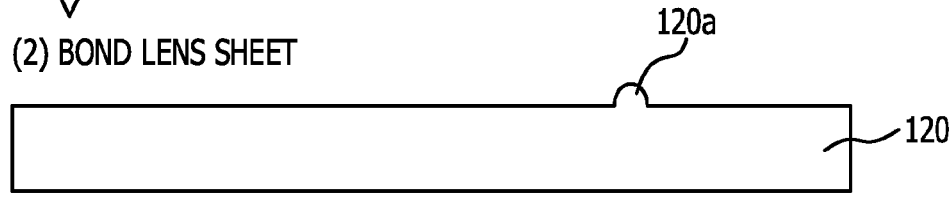
⇩
(3) INJECT LIGHT-TRANSMISSIVE RESIN
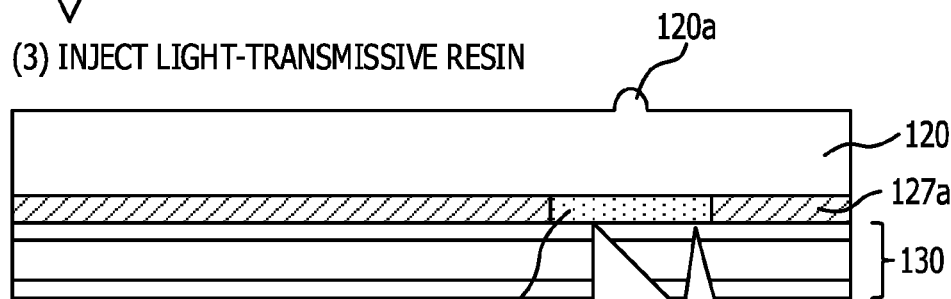
⇩
CONTINUE TO
(4) IN FIG. 6
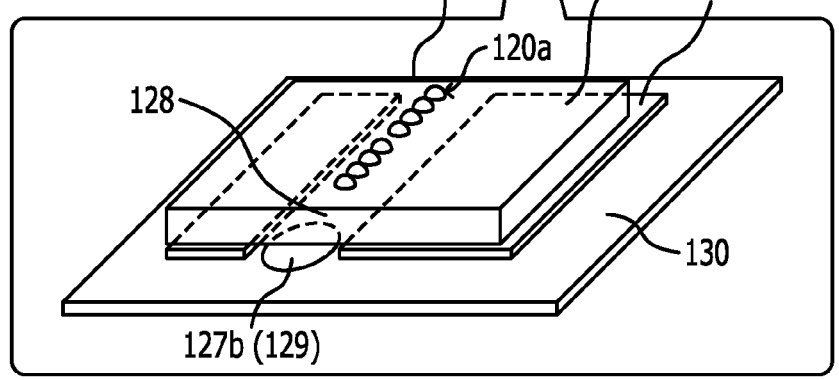

OPTICAL MODULE, METHOD FOR MANUFACTURING OPTICAL MODULE, AND OPTICAL TRANSCEIVER

CROSS-REFERENCE TO RELATED APPLICATION

This application is based upon and claims the benefit of priority of the prior Japanese Patent Application No. 2014-013773, filed on Jan. 28, 2014, the entire contents of which are incorporated herein by reference.

FIELD

The embodiments discussed herein are related to an optical module, a method for manufacturing the optical module, and an optical transceiver.

BACKGROUND

Small-sized optical modules that are manufacturable at low cost and relatively small compared with those in the optical communication in backbone systems of the related art are desired in optical interconnects. A technology is known in which a lens member and a stem where an optical semiconductor device is disposed are bonded together through a tubular spacer. In addition, a technology is known in which an adhesive material is permeated only on the outside of a frame body which is disposed in the lens member in optical components.

However, in the above-described technologies of the related art, a problem arises in which voids that are referred to as bubbles or gaps occur in a light-transmission part of a bonding layer which bonds the lens member and an optical waveguide portion in an optical module.

The followings are reference documents:
[Document 1] Japanese Laid-open Patent Publication No. 4-354385 and
[Document 2] Japanese Laid-open Patent Publication No. 2006-215288.

SUMMARY

According to an aspect of the invention, an optical module comprising: an optical waveguide transports light, the optical waveguide including a first mirror which reflects first light; an adhesive sheet formed over the optical waveguide, the adhesive sheet including a first gap above the first mirror; a first light-transmissive layer formed in the first gap; a lens sheet arranged over the adhesive sheet, the lens sheet including a first lens which is formed above the first light-transmissive layer; and a light-emitting device formed above the lens sheet, the light-emitting device including a light-emitting portion which emits the first light to the first lens.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a description diagram (part 1) illustrating one example of the manufacturing process of the optical transceiver according to the first embodiment;

DESCRIPTION OF EMBODIMENTS

Hereinafter, the first and second preferred embodiments of the technology to be disclosed will be described in detail with reference to the accompanying drawings.

First Embodiment

Basic Configuration of Optical Transceiver

Figure 1:
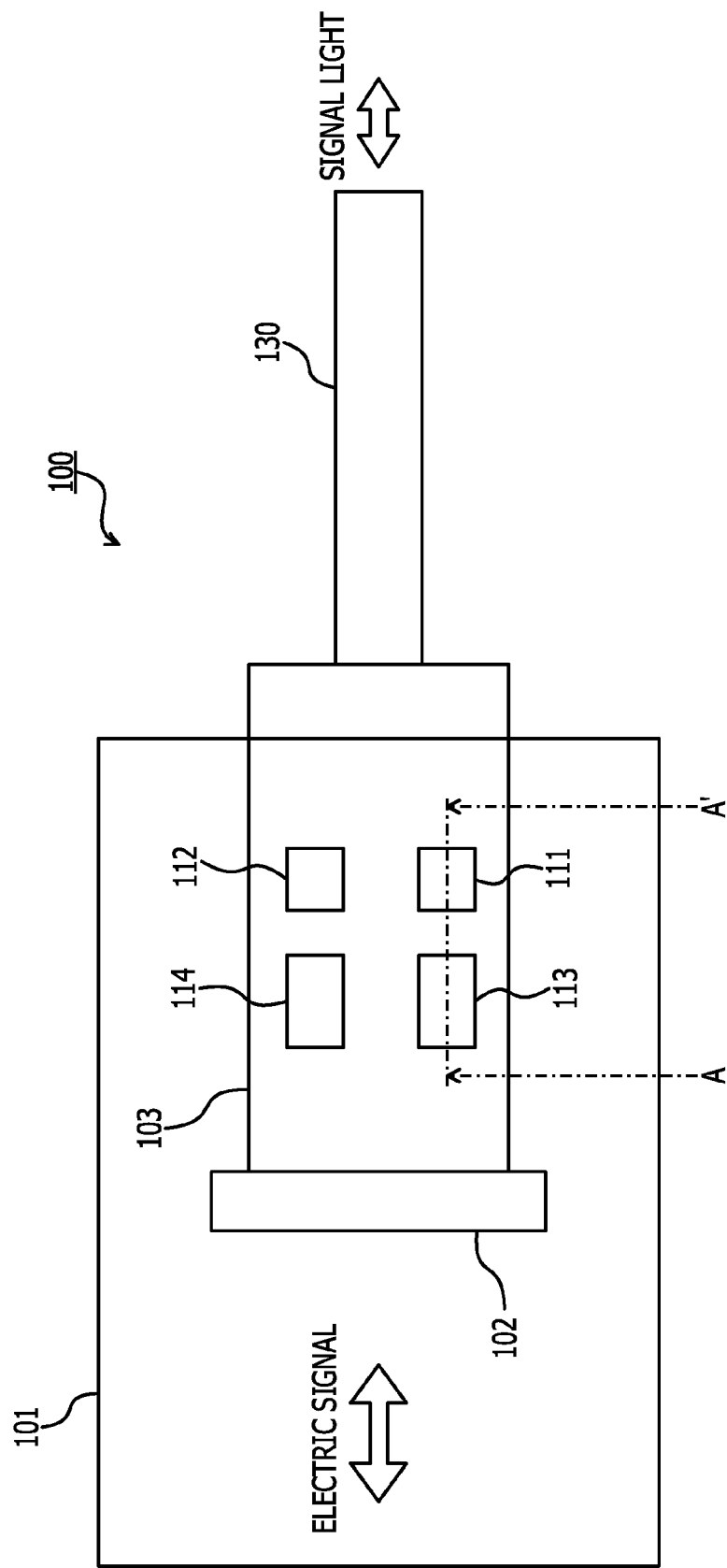
FIG. 1 is a top view illustrating one example of the configuration of an optical transceiver according to a first embodiment.
Figure 2:
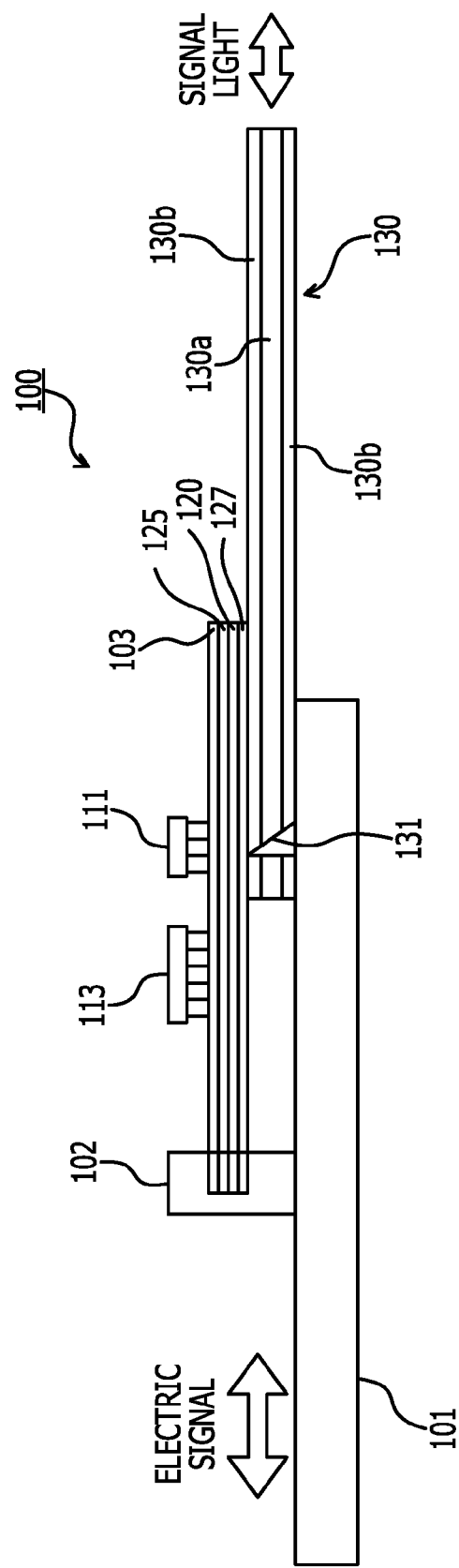
FIG. 2 is a side view of the optical transceiver according to the first embodiment.

FIG. 1 is a top view illustrating one example of the configuration of an optical transceiver according to the first embodiment. FIG. 2 is a side view of the optical transceiver according to the first embodiment. As illustrated in FIG. 1 and FIG. 2, an optical transceiver 100 includes a printed board 101, an optical board 103, and a waveguide member 130.

The printed board 101 is a board that transmits an electric signal. An electrical connector 102 is disposed in the printed board 101. The electrical connector 102 connects the printed board 101 and the optical board 103. The optical board 103, for example, includes a core layer and an electrode layer that is patterned on both surfaces of the core layer.

A light-receiving device 111 and a light-emitting device 112 are mounted face down on the upper surface of the optical board 103. Face down mounting means that a light-receiving portion 111a (refer to FIG. 3) of the light-receiving device 111 and a light-emitting portion (not illustrated) of the light-emitting device 112 are disposed facing the optical board 103.

The light-receiving device 111 receives light. The light-receiving device 111, for example, is a photodiode (PD) array. The light-emitting device 112 emits light. The light-emitting device 112, for example, is a vertical cavity semi-conductor emission laser (VCSEL) array.

A transimpedance amplifier (TIA) 113 and a drive IC 114 are arranged on the optical board 103. The TIA 113 converts a current from the light-receiving device 111 into a voltage. The drive IC 114 drives the light-emitting device 112 by supplying a drive current to the light-emitting device 112. The TIA 113 and the drive IC 114 are electrically connected to the printed board 101 through the optical board 103 and the electrical connector 102.

In addition, a cooling member such as a heat sink is disposed on the upper surface of the light-receiving device 111 and the light-emitting device 112 that are disposed on the optical board 103 so as to cool the light-receiving device 111 and the light-emitting device 112 by interposing, for example, a heat dissipation sheet or heat dissipation grease between the diodes and the cooling member. In this case, the heat sink is mounted on the optical board 103 by, for example, fixing with metal fasteners or screws.

A lens sheet 120 that is a lens member is attached on the surface of the optical board 103 on which the light-receiving device 111 and the light-emitting device 112 are not disposed with a board adhesive sheet 125 interposed between the lens sheet 120 and the optical board 103. The lens sheet 120 is made of a transparent material, and a lens portion 120a (refer to FIG. 3) for condensing light is formed in part of the lens sheet 120.

A bonding layer 127 is formed on the lower surface of the lens sheet 120. The bonding layer 127 bonds the lens sheet 120 and the waveguide member 130.

The waveguide member 130 not only transports light that is transmitted through the lens portion 120a but also transports and emits the light. Specifically, the waveguide member 130 transports light that is incident on the light-receiving device 111 or light that is output from the light-emitting device 112. The waveguide member 130 includes a core 130a and a cladding 130b that realize an optical waveguide. The core 130a is positioned at the central portion of the waveguide member 130. The cladding 130b has a lower refractive index than the core 130a and is arranged around the core 130a.

Accordingly, light in the core 130a is transported while being totally reflected at the interface between the core 130a and the cladding 130b. A polymer waveguide, for example, that includes an epoxy resin or an acrylate resin is used in the waveguide member 130. A low-cost waveguide that propagates multimode light may be used, but other waveguides may also be used in the waveguide member 130.

The waveguide member 130 includes a mirror 131 that is arranged at a position opposite the light-receiving device 111. The mirror 131 is, for example, formed by notching the waveguide member 130 through dicing or laser beam machining. The inclination angle of the mirror 131 is, for example, 45°. For this reason, the mirror 131 is able to bend light that is transported in the waveguide member 130 and light that is incident in the waveguide member 130 at 90°. Accordingly, not only is the traveling direction of the light transported in the waveguide member 130 bent at 90° so that the light is able to be emitted to the light-receiving device 111, but the traveling direction of the light emitted from the light-emitting device 112 is also bent at 90° so that the light is able to be transported in the waveguide member 130.

Figure 3:
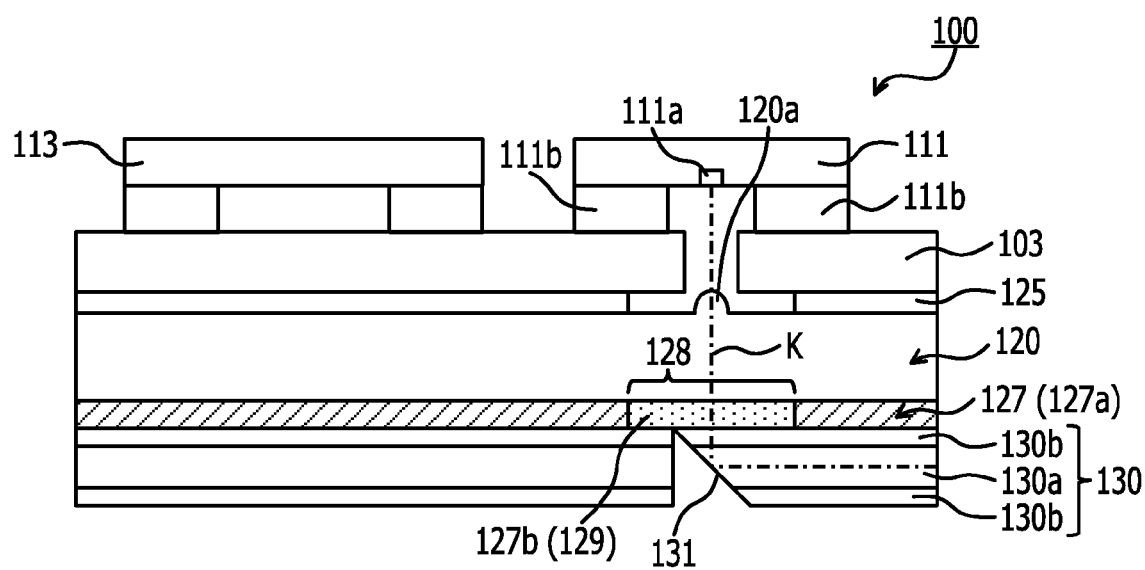
FIG. 3 is an enlarged partial cross-sectional view taken along line III-III of FIG. 1.

FIG. 3 is an enlarged partial cross-sectional view taken along line III-III of FIG. 1. As illustrated in FIG. 3, the optical board 103 has an open part that corresponds to an optical path K through which light is transmitted. The optical board 103 may not have an open part that corresponds to the optical path K provided that light-transmissive transparent materials are used.

The light-receiving device 111 includes the light-receiving portion 111a and terminals 111b. Arranged toward the lens sheet 120 side, the light-receiving portion 111a is mounted face down and receives light that is transmitted through the lens sheet 120. The light-receiving device 111 converts the received light into a signal current. The light-receiving portion 111a is, for example, formed to have a circular shape. The terminals 111b are connected to the optical board 103 and transports the signal current to the connected optical board 103.

Although not illustrated, the light-emitting device 112 includes the light-emitting portion and terminals. Arranged toward the lens sheet 120 side similarly to the light-receiving portion 111a, the light-emitting portion is mounted face down and outputs light toward the lens sheet 120. The light-emitting device 112 converts an input signal current into light. The light-emitting portion is, for example, formed to have a circular shape. In addition, the terminals of the light-emitting device 112 are connected to the optical board 103 and transports the signal current to the connected optical board 103.

The board adhesive sheet 125 bonds the optical board 103 and the lens sheet 120. The board adhesive sheet 125 has an opening portion that is formed at a position corresponding to the optical path K so that light is able to be transmitted from the optical board 103 to the lens sheet 120. The board adhesive sheet 125 has, for example, a thickness of 25 μm.

The lens sheet 120 is a transparent member. For example, a thermoplastic resin such as a cyclic olefin polymer (COP) and polycarbonate (PC) is used in the lens sheet 120. The lens sheet 120 has, for example, a thickness of 60 μm.

The lens portion 120a for condensing light is formed in the lens sheet 120. The lens portion 120a transmits light emitted from the light-emitting device 112 and light emitted by the waveguide member 130. The lens portion 120a illustrated in FIG. 3 is, for example, a convex lens that has a predetermined height. The lens portion 120a is not limited to a convex lens but may be a concave lens.

The bonding layer 127 is a layer for bonding in which an adhesive sheet 127a that bonds the lens portion 120a and the waveguide member 130 is arranged with a gap 128 disposed therein. The gap 128 allows light transmitted through the lens portion 120a to pass to the waveguide member 130 and allows light emitted by the waveguide member 130 to pass to the lens portion 120a. For example, the gap 128 may be formed by disposing an opening portion in an area that includes the optical path K between the lens portion 120a and the waveguide member 130 in the adhesive sheet 127a.

The adhesive sheet 127a is arranged in an area other than the gap 128 that includes the optical path K between the lens portion 120a and the waveguide member 130 and bonds the lens sheet 120 and the waveguide member 130. Specifically, the adhesive sheet 127a is a sheet that has an adhesiveness on the surfaces thereof and bonds the lens sheet 120 and the waveguide member 130. The adhesive sheet 127a is formed in advance to have a uniform thickness (for example, 25 μm), and, for example, a sheet with a thickness variation of 2 μm or less is used as the adhesive sheet 127a.

In addition, a sheet with sufficiently small thickness change caused by pressurization with respect to the distance between the lens and the mirror or a sheet of which the thickness changes to be proportional to a pressure is used as the adhesive sheet 127*a*. A thermosetting adhesive sheet or an ultraviolet-curable adhesive sheet is used as the adhesive sheet 127*a*. The thermosetting adhesive sheet bonds the lens sheet 120 and the waveguide member 130 by the adhesive surfaces thereof being cured by heating. The ultraviolet-curable adhesive sheet bonds the lens sheet 120 and the waveguide member 130 by the adhesive surfaces thereof being cured by ultraviolet radiation.

In addition, the adhesive sheet 127*a* may not have a light transmissivity since arranged on an area where light is not transmitted through other than the gap 128. For this reason, even without considering the transmissivity, the adhesive sheet 127*a* selected based only on the thickness, the thickness uniformity, and the adhesiveness thereof may be used.

The light-transmissive resin 127*b* forms a transmissive portion 129 that transmits light by filling the gap 128 with a liquid-state light-transmissive resin. Specifically, the light-transmissive resin 127*b* is a liquid-state light-transmissive resin. Liquid state specifically means a liquid that has fluidity. The light-transmissive resin 127*b*, for example, has a viscosity of 1000 cP or less.

For example, the light-transmissive resin 127*b* is an adhesive resin that bonds the lens sheet 120 and the waveguide member 130. Accordingly, occurrence of voids is suppressed by closely bonding the light-transmissive resin 127*b* and the lens sheet 120, and the light-transmissive resin 127*b* and the waveguide member 130. A thermosetting adhesive resin that is cured by heating or an ultraviolet-curable adhesive resin that is cured by ultraviolet radiation is used as the light-transmissive resin 127*b*.

According to such a configuration, the optical transceiver 100 is able to condense light that is output from other optical transceivers 100 in the light-receiving portion 111*a*. In addition, the optical transceiver 100 is able to output light that is emitted from the light-emitting device 112, which is not illustrated, from the waveguide member 130 to other optical transceivers 100.

In addition, an optical module for receiving light is able to be realized by the optical board 103, the light-receiving device 111, the lens sheet 120, the board adhesive sheet 125, the bonding layer 127, the waveguide member 130, and the transmissive portion 129. In addition, an optical module for emitting light is able to be realized by the optical board 103, the light-emitting device 112, the lens sheet 120, the board adhesive sheet 125, the bonding layer 127, the waveguide member 130, and the transmissive portion 129.

The optical transceiver 100 has both an optical module that includes the light-receiving device 111 and an optical module that includes the light-emitting device 112 mounted thereon. The lens sheet 120 is formed by integrating the lens portion 120*a* that transmits light to the light-receiving device 111 with the lens portion 120*a* that transmits light from the light-emitting device 112. In addition, the waveguide member 130 is formed by integrating an optical waveguide (the core 130*a* and the cladding 130*b*) that transports light to the light-receiving device 111 with an optical waveguide (the core 130*a* and the cladding 130*b*) that transports light from the light-emitting device 112.

In addition, the transmissive portion 129 is formed by integrating the transmissive portion 129 that transmits light to the light-receiving device 111 with the transmissive portion 129 that transmits light from the light-emitting device 112. In addition, the bonding layer 127 is formed by integrating the bonding layer 127 of a forming body for receiving light with the bonding layer 127 of a forming body for emitting light. The forming body for receiving light is the lens sheet 120 that includes the lens portion 120*a* which transmits light to the light-receiving device 111 and the waveguide member 130 that transports light to the light-receiving device 111. The forming body for emitting light is formed by integrating the lens sheet 120 that includes the lens portion 120*a* which transmits light from the light-emitting device 112 with the bonding layer 127 that bonds the waveguide member 130 which transports light from the light-emitting device 112.

Regarding One Example of Manufacturing Process of Optical Transceiver

Figure 4:
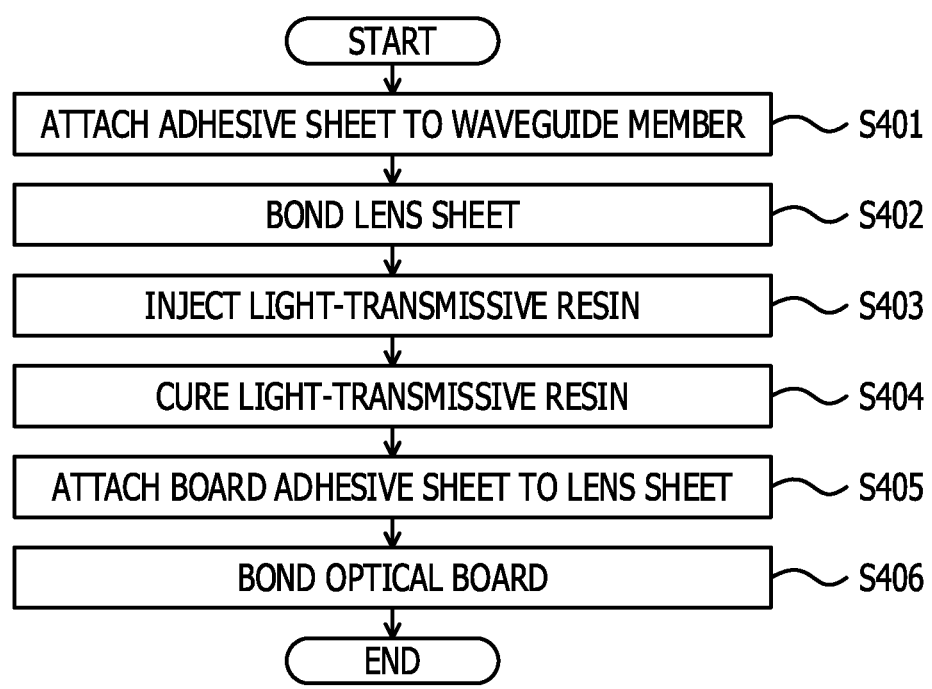
FIG. 4 is a flow chart illustrating one example of the manufacturing process of the optical transceiver.

Next, one example of the manufacturing process of the optical transceiver will be described using FIGS. 4 to 6. FIG. 4 is a flow chart illustrating one example of the manufacturing process of the optical transceiver. In the manufacturing process of the optical transceiver 100 illustrated in FIG. 4, a process of attaching the adhesive sheet 127*a* to the waveguide member 130 is first performed (step S401).

Next, a process of bonding the waveguide member 130 and the lens sheet 120 is performed by attaching the lens sheet 120 to the adhesive sheet 127*a* to which the waveguide member 130 is attached in step S401 (step S402).

Next, a process of filling the gap 128 with the light-transmissive resin 127*b*, to which the adhesive sheet 127*a* is not attached, in the forming body of the waveguide member 130, the lens sheet 120, and the adhesive sheet 127*a* that are integrated with each other in step S402 is performed (step S403).

Next, a process of curing the light-transmissive resin 127*b* that is filled in step S403 is performed (step S404). In step S404, heating or ultraviolet radiation is performed according to the type of the adhesive sheet 127*a* and the light-transmissive resin 127*b* used.

Then, a process of attaching the board adhesive sheet 125 to the lens sheet 120 among the forming body of the waveguide member 130, the lens sheet 120, the adhesive sheet 127*a*, and the light-transmissive resin 127*b* is performed (step S405). Next, a process of bonding the forming body and the optical board 103 by attaching the optical board 103 to the board adhesive sheet 125 that is attached to the forming body is performed (step S406), and the manufacturing process according to this flow chart ends.

The adhesive sheet 127*a* is first attached to the waveguide member 130 (refer to step S401), and the lens sheet 120 is attached thereafter (refer to step S402) in the flow chart described above. However, the process order of step S401 and step S402 may be reversed.

FIG. 5 is a description diagram (part 1) illustrating one example of the manufacturing process of the optical transceiver according to the first embodiment. FIG. 6 is a description diagram (part 2) illustrating one example of the manufacturing process of the optical transceiver according to the first embodiment. As illustrated in FIG. 5, first, (1) attach the adhesive sheet 127*a* to the waveguide member 130. At this time, the adhesive sheet 127*a* is attached to the waveguide member 130 while the gap 128 is secured.

Next, (2) attach the lens sheet 120 to the adhesive sheet 127*a* that is attached to the waveguide member 130. Accordingly, the waveguide member 130 and the lens sheet 120 are bonded together. At this time, a predetermined pressure (for example, maximum 0.1 MPa to 0.5 MPa) is used in pressurizing the waveguide member 130 and the lens sheet 120 since the angle of the mirror 131 of the waveguide member 130 is deformed when the pressure is high.

Then, (3) fill the gap 128 with the light-transmissive resin 127*b*, to which the adhesive sheet 127*a* is not attached. At this time, the light-transmissive resin 127*b* is able to be injected into the gap 128 without flowing to the places other than the gap 128 since the gap 128 is formed by the adhesive sheet 127a.

Here, an opening 128k is disposed on a side of the gap 128 that is opposite the side from which the light-transmissive resin 127b is injected. Specifically, the gap 128 is disposed so as to penetrate the forming body that includes the bonding layer 127, the lens sheet 120, and the waveguide member 130 which are bonded with the bonding layer 127. Accordingly, the light-transmissive resin 127b is able to be injected in one direction from one side, and air inside the gap 128 is able to be efficiently discharged by injecting the light-transmissive resin 127b. For this reason, the light-transmissive resin 127b is able to be injected without gaps, and occurrence of voids is able to be suppressed.

Figure 6:
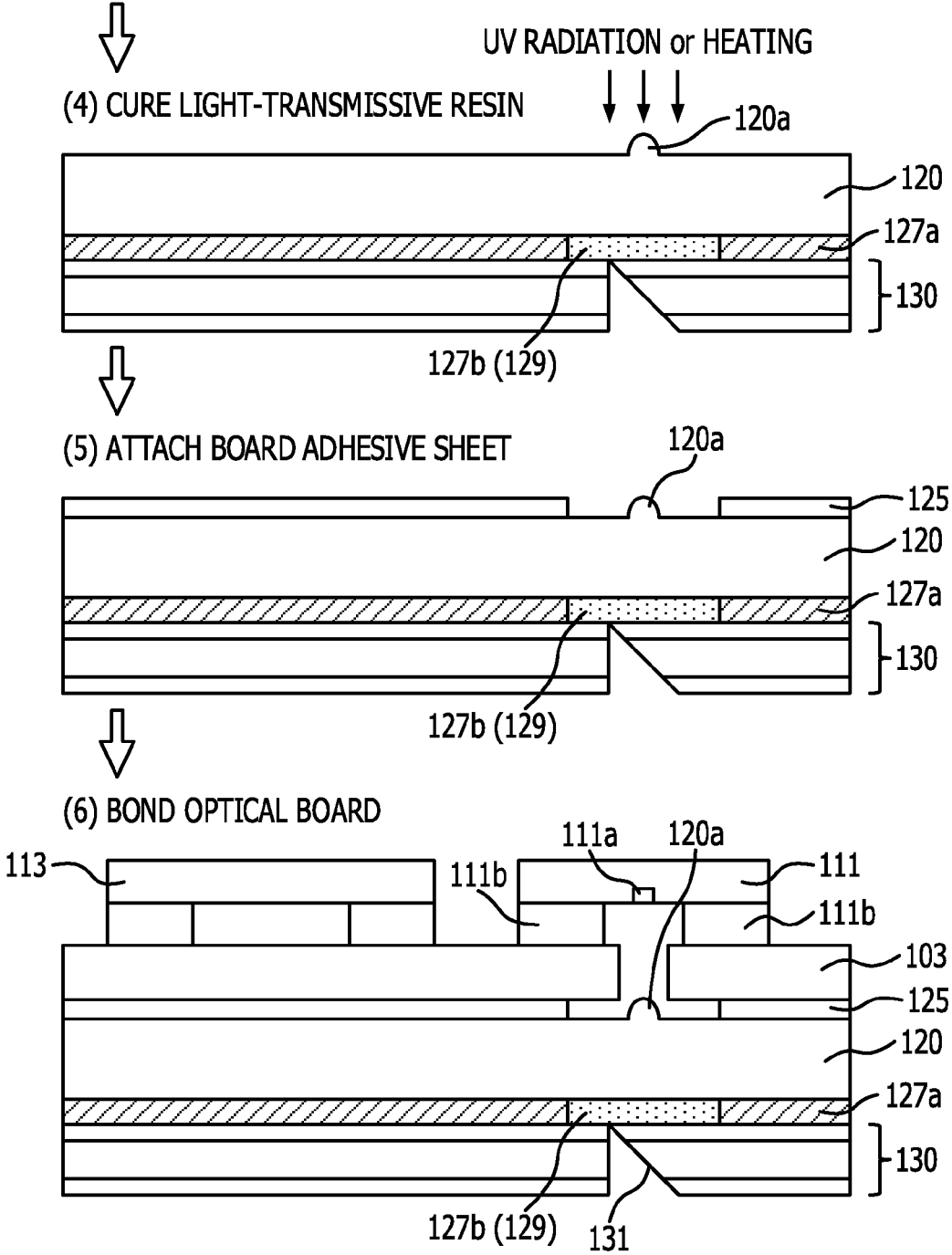
FIG. 6 is a description diagram (part 2) illustrating one example of the manufacturing process of the optical transceiver according to the first embodiment.

Then, as illustrated in FIG. 6, (4) perform ultraviolet (UV) radiation or heating process according to the type of the adhesive sheet 127a and the light-transmissive resin 127b used. Accordingly, the adhesive sheet 127a and the light-transmissive resin 127b are cured.

Then, (5) attach the board adhesive sheet 125 to the upper surface of the lens sheet 120. At this time, the board adhesive sheet 125 is not attached to the area around the lens portion 120a so as to secure the optical path K. Next, (6) bond the optical board 103 to the forming body by attaching the optical board 103 to the board adhesive sheet 125. Accordingly, the optical transceiver 100 is able to be manufactured.

Figure 7:
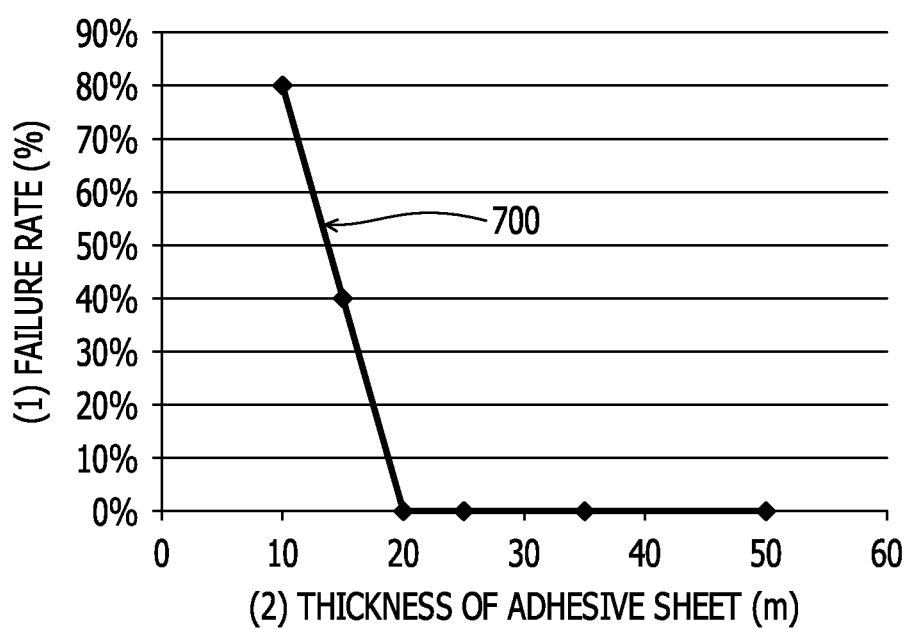
FIG. 7 is a graph illustrating the relationship between the thickness of an adhesive sheet and filling failure of a light-transmissive resin.

Relationship Between Thickness of Adhesive Sheet and Filling Failure of Light-Transmissive Resin FIG. 7 is a graph illustrating the relationship between the thickness of the adhesive sheet and filling failure of the light-transmissive resin. In FIG. 7, the horizontal axis indicates the thickness of the adhesive sheet 127a, and the vertical axis indicates the failure rate of the light-transmissive resin 127b. Failure of the light-transmissive resin 127b means that the light-transmissive resin 127b does not flow and stops and the gap 128 is not properly filled, thereby causing voids to occur. Specifically, the failure rate of the light-transmissive resin 127b indicates the occurrence rate of voids. The viscosity of the light-transmissive resin 127b is, for example, 1000 cP or less.

As illustrated in relationship 700, the failure rate is 0% when the thickness of the adhesive sheet 127a is 20 μm, 25 μm, 35 μm, or 50 μm. That is, this indicates voids do not occur in all the manufactured optical transceivers 100.

Meanwhile, the failure rate is 80% when the thickness of the adhesive sheet 127a is 10 μm. The failure rate being 80%, for example, indicates voids do not occur in only one sample while occurring in four other samples given that the number of samples is five.

The failure rate is 40% when the thickness of the adhesive sheet 127a is 15 μm. The failure rate being 40%, for example, indicates that voids do not occur in three samples while occurring in two other samples given that the number of samples is five.

Accordingly, by setting the thickness of the adhesive sheet 127a to be within 20 μm to 50 μm, the light-transmissive resin 127b is able to be injected into the gap 128 without gaps with respect to all the manufactured optical transceivers 100. Therefore, occurrence of voids is able to be suppressed.

Focal Point of Light

Figure 8:
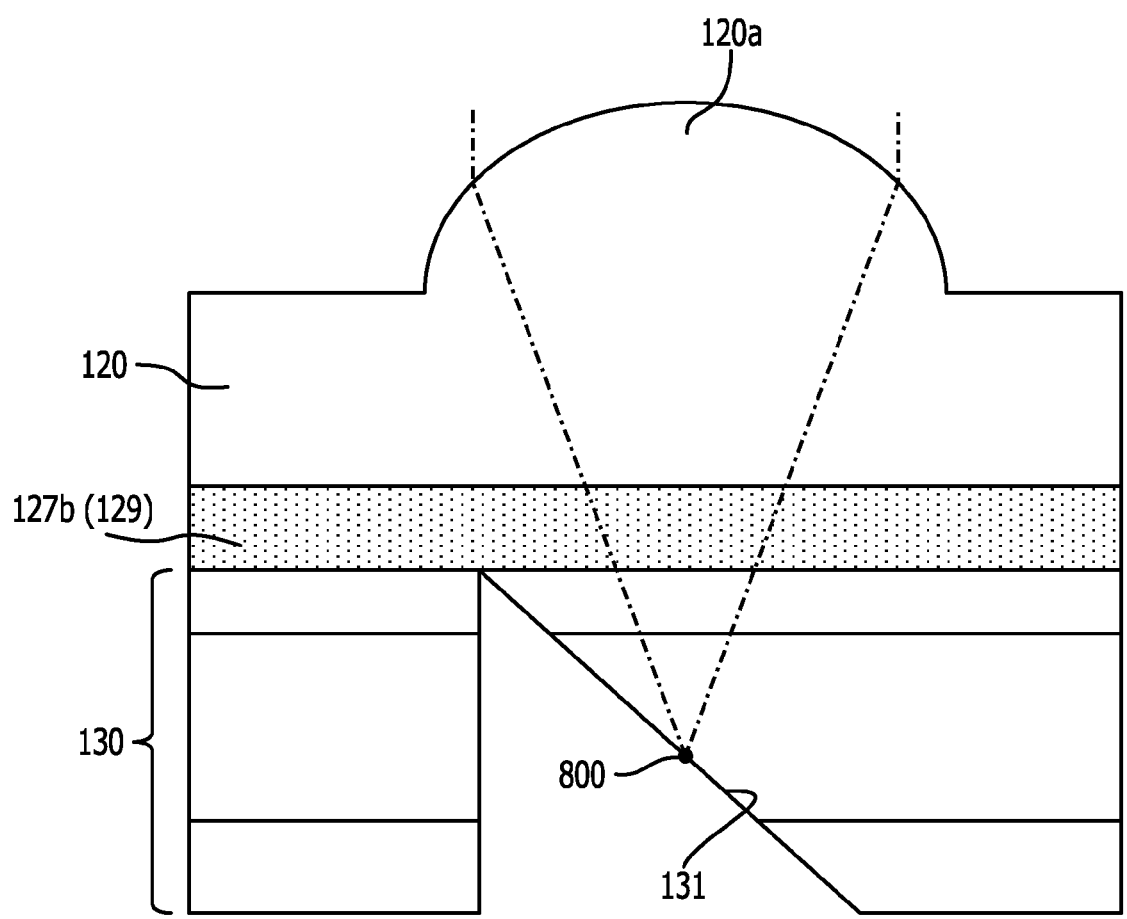
FIG. 8 is a description diagram illustrating the focal point of light in the optical transceiver according to the first embodiment.

Next, the focal point of light will be described using FIG. 8, FIG. 9A, and FIG. 9B. FIG. 8 is a description diagram illustrating the focal point of light in the optical transceiver according to the first embodiment. As illustrated in FIG. 8, the focal point of light of the optical transceiver 100 according to the first embodiment is consistent with a focal point 800 in the design of the optical transceiver. Specifically, the optical transceiver 100 is able to suppress occurrence of voids since the light-transmissive resin 127b is injected into the gap 128. Accordingly, the inconsistency between the position of the focal point and the focal point 800 in the design caused by occurrence of voids (refer to FIG. 9A) is able to be suppressed, and the position of the focal point is able to be set at the same position as that of the focal point 800 in the design. For this reason, the optical transceiver 100 is able to suppress optical loss.

In addition, the optical transceiver 100 uses the adhesive sheet 127a of which the thickness variation is small and is able to make the variations in the distance between the lens portion 120a and the mirror 131 small (for example, ≤±10 μm). For this reason, the optical transceiver 100 is able to suppress the inconsistency between the position of the focal point and the focal point 800 in the design caused by the thickness of the bonding layer 127 being different from the allowable thickness in the design (refer to FIG. 9B). That is, the optical transceiver 100 is able to set the thickness of the bonding layer 127 to be the allowable thickness in the design and is able to set the position of the focal point to be the same position as that of the focal point 800 in the design. For this reason, the optical transceiver 100 is able to suppress optical loss.

Figure 9A:
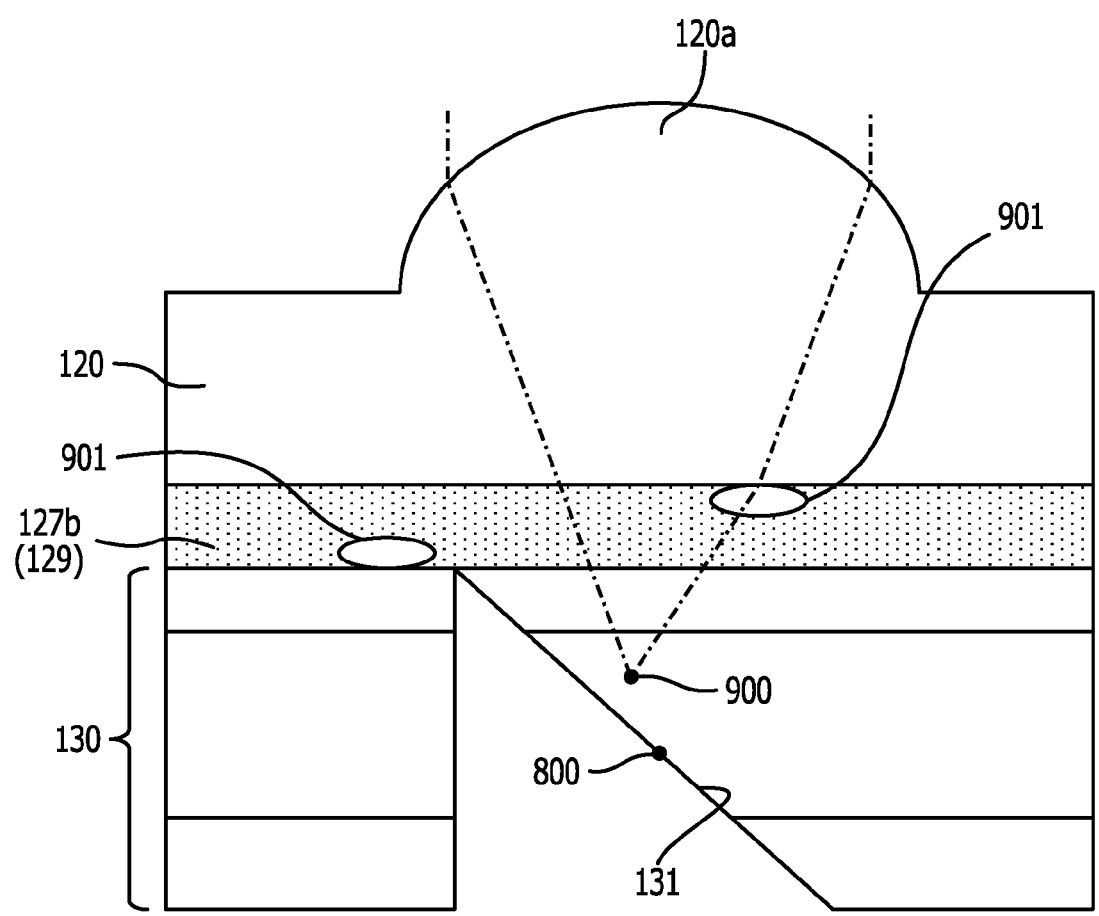
FIG. 9A is a description diagram (part 1) illustrating the focal point of light in an optical transceiver of the related art.

FIG. 9A is a description diagram (part 1) illustrating the focal point of light in an optical transceiver of the related art. The optical transceiver of the related art, for example, uses the bonding layer 127 with the light-transmissive resin 127b layer formed on the whole surfaces of the bonding layer 127. The light-transmissive resin 127b is applied to the whole surfaces of the bonding layer 127 in the manufacture of the optical transceiver of the related art. However, as illustrated in FIG. 9A, voids 901 occur depending on the application method or the application amount when applying the light-transmissive resin 127b. When the voids 901 occur on the optical path K, the refractive index of light changes in the voids 901, and the position of a focal point 900 differs from that of the focal point 800 in the design. Accordingly, optical loss occurs.

On the other hand, the occurrence of the voids 901 may be suppressed by increasing the pressure when bonding the waveguide member 130 and the lens sheet 120 in the manufacture of the optical transceiver. However, the mirror 131 deforms when the pressure increases, so the pressure does not actually increase.

In addition, assume a configuration in which the gap 128 is not disposed, and the transmissive adhesive sheet 127a is also inserted into the transmissive portion 129 where the light-transmissive resin 127b is injected. In this configuration, gaps occur between the lens sheet 120 and the adhesive sheet 127a when the adhesive sheet 127a in the transmissive portion 129 has a waviness on the surface that adheres to the lens sheet 120. As a consequence, voids occur. Accordingly, in the configuration in which the transmissive adhesive sheet 127a is inserted into the transmissive portion 129, the position of the focal point differs from that of the focal point 800 in the design similar to the focal point of light in the optical transceiver of the related art illustrated in FIG. 9A.

On the contrary, the optical transceiver 100 according to the first embodiment is able to fill the gap 128 with the light-transmissive resin 127b by injecting the light-transmissive resin 127b into the gap 128. Therefore, occurrence of voids in the transmissive portion 129 is able to be suppressed. For this reason, the position of the focal point is able to be consistent with the focal point 800 in the design, and optical loss is able to be suppressed.

Figure 9B:
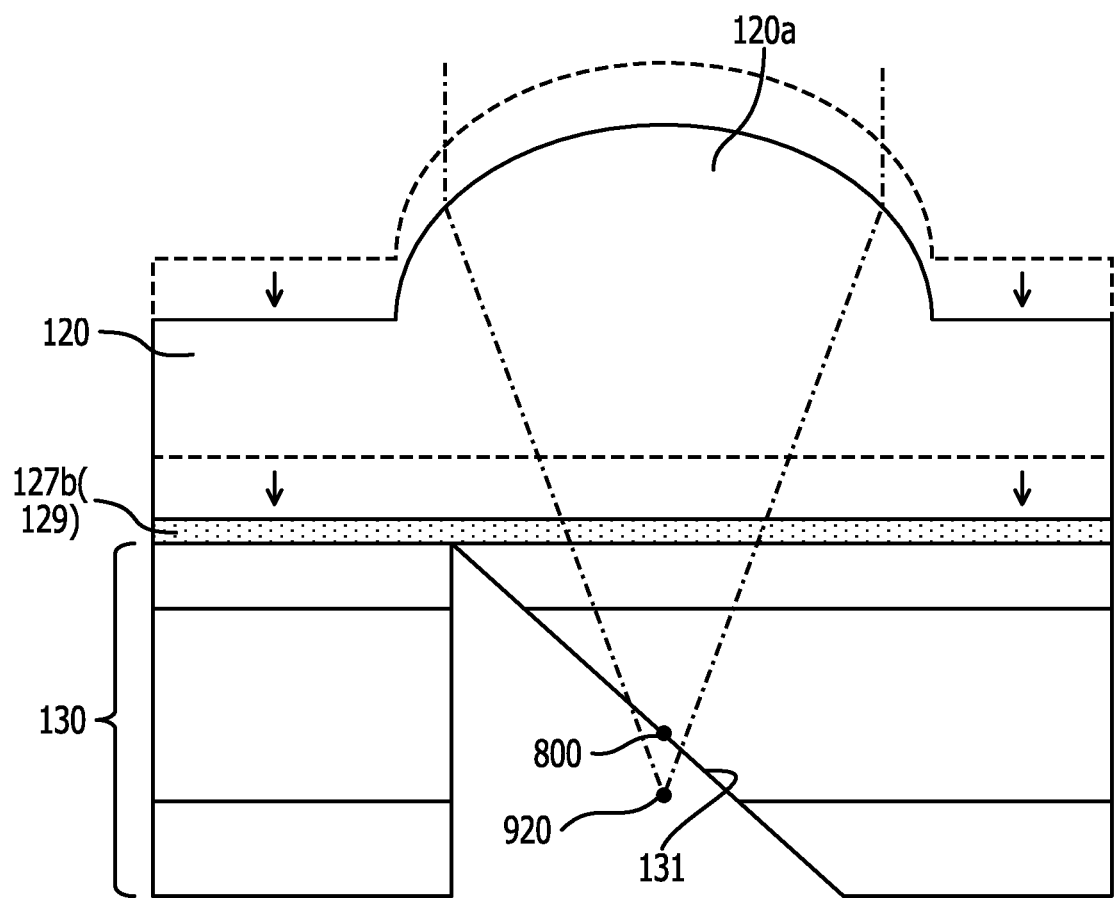
FIG. 9B is a description diagram (part 2) illustrating the focal point of light in the optical transceiver of the related art.

FIG. 9B is a description diagram (part 2) illustrating the focal point of light in the optical transceiver of the related art. The optical transceiver of the related art, for example, uses the bonding layer 127 with the light-transmissive resin 127b layer formed on the whole surfaces of the bonding layer 127. The waveguide member 130 and the lens sheet 120 are pressurized when bonded in the manufacture of the optical transceiver of the related art. At this time, the distance between the lens portion 120a and the mirror 131 may be an unallowable thickness depending on the application amount and the application method of the light-transmissive resin 127b that is applied to the whole surfaces of the bonding layer 127 and the pressure during the application.

Specifically, the variation in the distance between the lens portion 120a and the mirror 131 is ±10 µm or less in the optical transceiver 100 according to the first embodiment but is approximately ±20 µm in the configuration of the related art in which the light-transmissive resin 127b is applied to the whole surfaces of the bonding layer 127. Accordingly, the distance between the lens portion 120a and the mirror 131 changes when the thickness variation of the bonding layer 127 increases. Thus, the position of a focal point 920 differs from the focal point 800 in the design. Therefore, optical loss occurs.

Meanwhile, assuming a configuration in which the gap 128 is not filled with the light-transmissive resin 127b to be an air layer, for example, flexure occurs in the lens sheet 120, so the distance between the lens portion 120a and the mirror 131 changes. Therefore, the position of the focal point changes, and optical loss occurs.

On the contrary, the optical transceiver 100 according to the first embodiment is able to set the thickness of the bonding layer 127 to be the allowable thickness in the design by using the adhesive sheet 127a and is able to set the distance between the lens portion 120a and the mirror 131 to be consistent. For this reason, the position of the focal point is able to be set at the same position as that of the focal point 800 in the design, and optical loss is able to be suppressed.

In the first embodiment hereinbefore, the gap 128 is disposed in the part where light passes in the bonding layer 127 that bonds the lens sheet 120 and the waveguide member 130 with the adhesive sheet 127a, and the liquid-state light-transmissive resin 127b is injected into the gap 128 to form the transmissive portion 129. Accordingly, occurrence of voids is able to be suppressed in the transmissive portion 129, and optical loss is able to be suppressed.

Modification Example of First Embodiment

Figure 10:
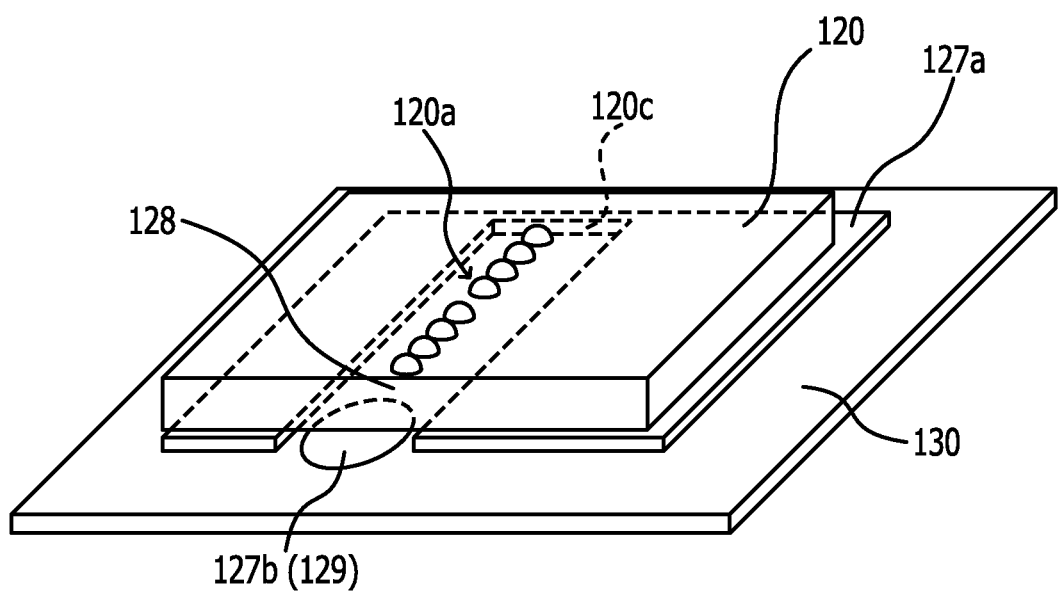
FIG. 10 is a description diagram illustrating a modification example of the first embodiment.

FIG. 10 is a description diagram illustrating a modification example of the first embodiment. The modification example illustrated in FIG. 10 differs from the first embodiment in that the opening 128k (refer to FIG. 5) is not disposed on the side of the gap 128 that is opposite the side from which the light-transmissive resin 127b is injected, but a barrier 120c is formed. Specifically, the gap 128 is not configured to penetrate the forming body that includes the bonding layer 127, the lens sheet 120, and the waveguide member 130 which are bonded with the bonding layer 127 in the modification example. In the modification example, the same places as the places described in the first embodiment will be given the same reference signs and will not be described.

The barrier 120c is formed by a part of the lens sheet 120 and bonds the lens sheet 120 and the waveguide member 130. The barrier 120c is arranged at a position where the optical path K avoids. In the modification example, the adhesion strength between the lens sheet 120 and the waveguide member 130 is able to be increased at a stage prior to injecting the light-transmissive resin 127b. Therefore, manufacturing efficiency is able to be improved. In addition, the thickness of the bonding layer 127 in the transmissive portion 129 is able to be set further closer to the thickness of the adhesive sheet 127a in the modification example.

According to such a modification example, like in the first embodiment, occurrence of voids is able to be suppressed, and the thickness of the bonding layer 127 is able to be set to the allowable thickness in the design. Therefore, optical loss is able to be suppressed.

Second Embodiment

Figure 11:
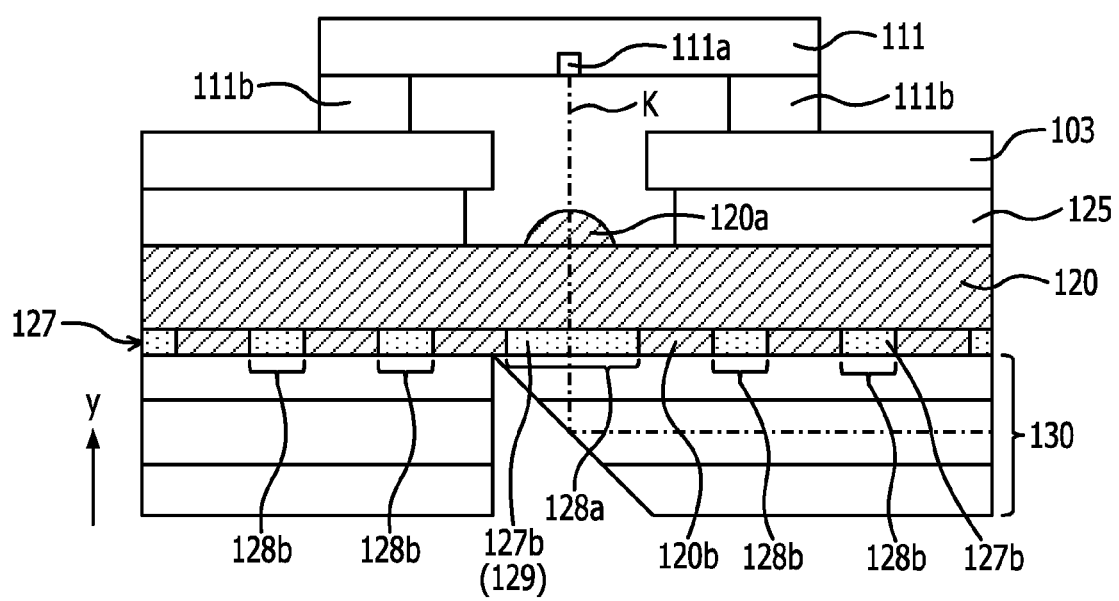
FIG. 11 is a description diagram illustrating an optical module of an optical transceiver according to a second embodiment.

FIG. 11 is a description diagram illustrating an optical module of an optical transceiver according to a second embodiment. In the second embodiment, a configuration in which the adhesive sheet 127a is not used, and an interposed member (standoff) that adjusts the height of a layer between the lens portion 120a and the waveguide member 130 is used will be described. In the second embodiment, the same places as the places described in the first embodiment will be given the same reference signs and will not be described.

As illustrated in FIG. 11, a standoff 120b is arranged while a first gap 128a that allows light on the optical path K to pass therethrough and a second gap 128b which differs from the first gap 128a are disposed between the lens sheet 120 and the waveguide member 130. Specifically, the standoff 120b is arranged in an area other than the first gap 128a that includes the optical path K between the lens portion 120a and the waveguide member 130 and abuts on the surface of the lens sheet 120 and on the surfaces of the waveguide member 130. The standoff 120b has a consistent thickness (for example, 25 µm).

For example, the standoff 120b is disposed in the lens sheet 120. Specifically, a plurality of standoffs 120b is formed on a side of the lens sheet 120 that is opposite the side where the lens portion 120a is formed. The plurality of standoffs 120b each has an elliptic shape (refer to (2) in FIG. 12) and is separately arranged while the longitudinal direction thereof is aligned to one direction (y direction in FIG. 11). The plurality of standoffs 120b each has a uniform thickness.

The thickness of the standoff 120b is, for example, the same as the thickness of the adhesive sheet 127a illustrated in the first embodiment. Accordingly, the standoff 120b is able to secure a consistent distance (thickness) between the lens sheet 120 and the waveguide member 130, and change in the position of the focal point is able to be suppressed.

The standoff 120b is formed into an elliptic cylinder shape. The standoff 120b is formed in the manufacturing process of the lens portion 120a. Specifically, the lens portion 120a and the standoff 120b are able to be simultaneously formed in the manufacturing process of the lens portion 120a by using a die that is modeled on the lens portion 120a and the standoff 120b.

The light-transmissive resin 127b is injected into the first gap 128a for securing the optical path K and the second gap 128b between each of the standoffs 120b to bond the lens sheet 120 and the waveguide member 130. Injecting the liquid-state light-transmissive resin 127b into the first gap 128a forms the transmissive portion 129. In addition, injecting the liquid-state light-transmissive resin 127b into the second gap 128b forms a bonding portion that bonds the lens sheet 120 and the waveguide member 130.

Figure 12:
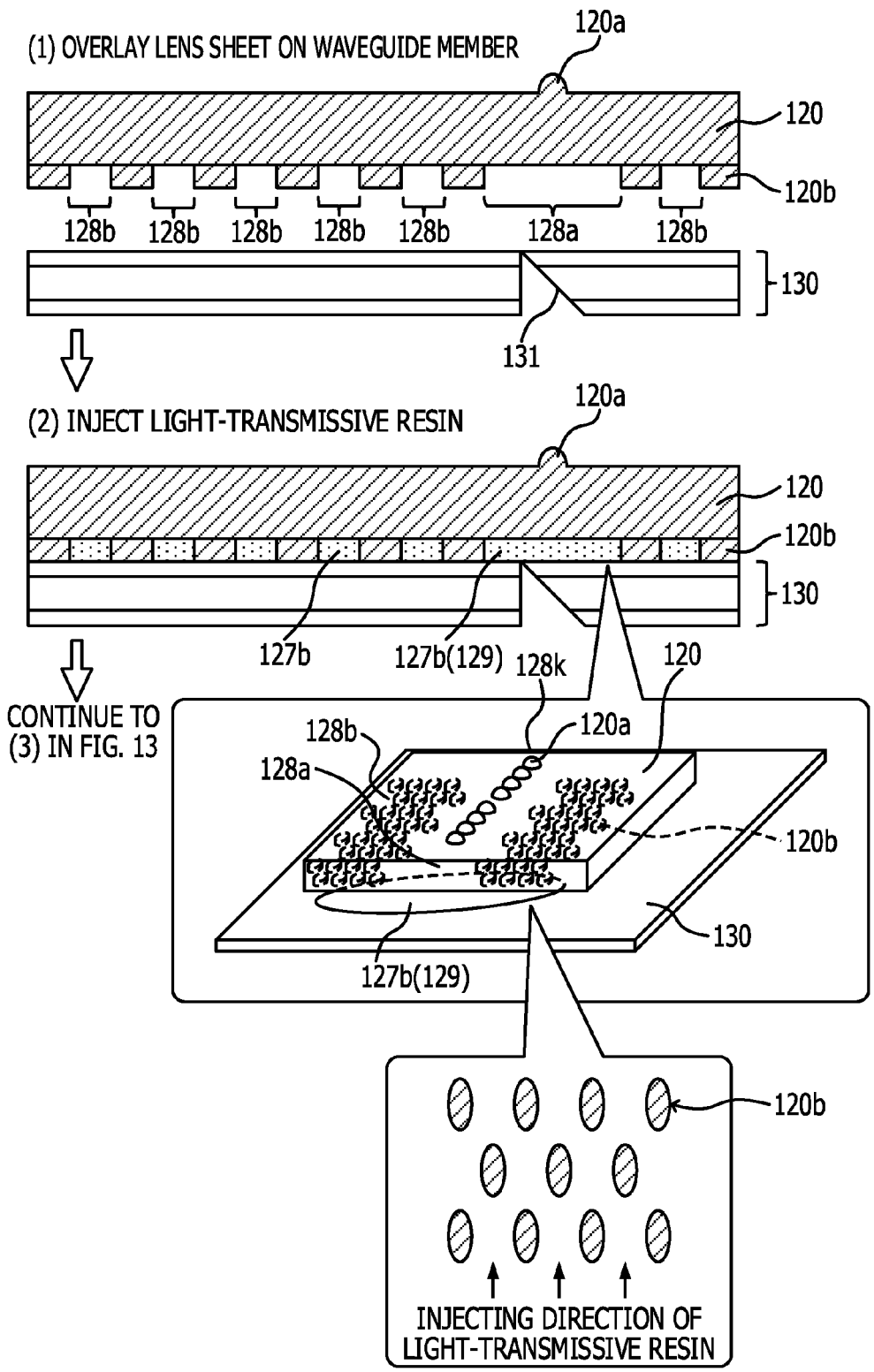
FIG. 12 is a description diagram (part 1) illustrating one example of the manufacturing process of the optical transceiver according to the second embodiment.
Figure 13:
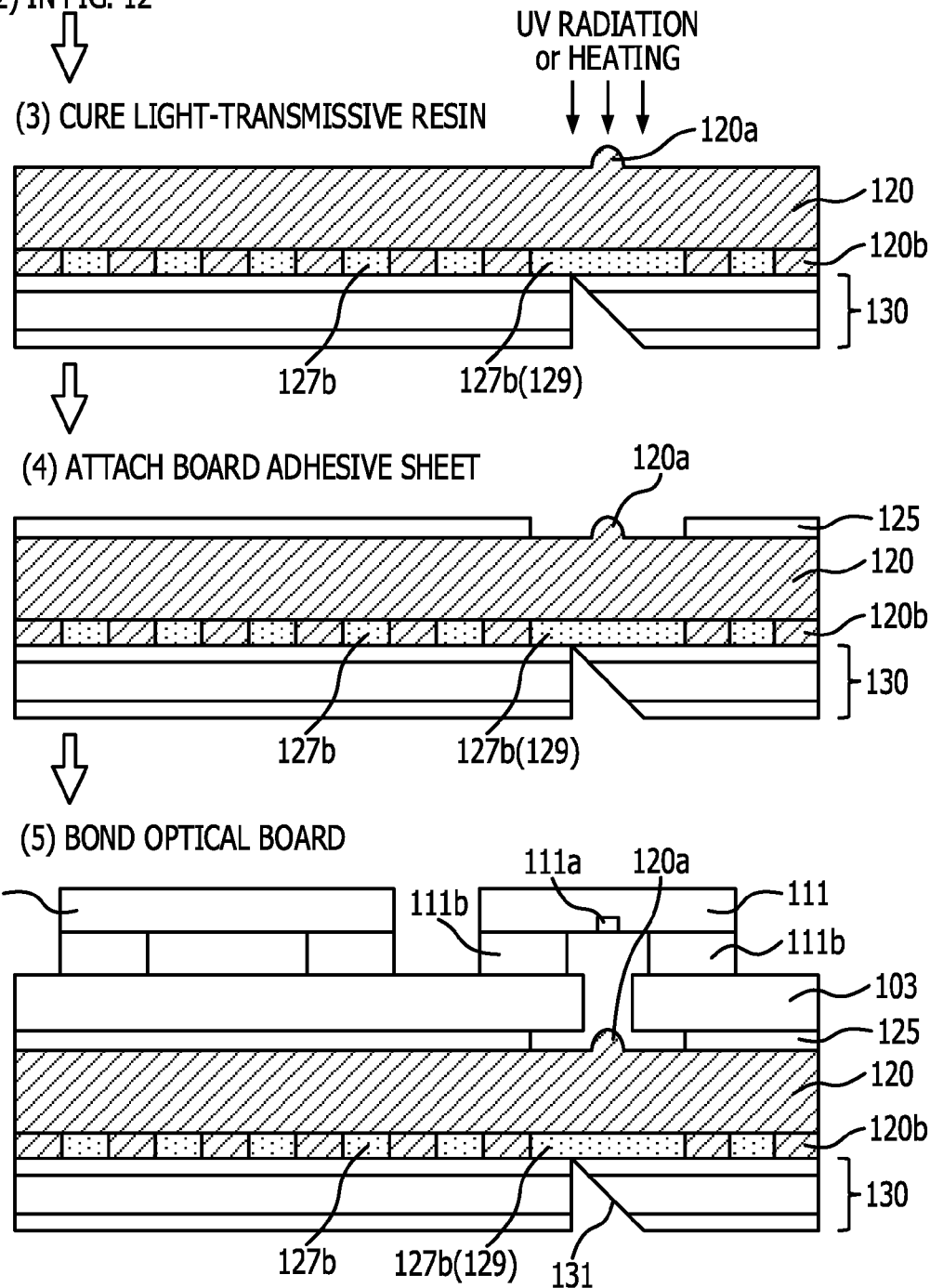
FIG. 13 is a description diagram (part 2) illustrating one example of the manufacturing process of the optical transceiver according to the second embodiment.

FIG. 12 is a description diagram (part 1) illustrating one example of the manufacturing process of the optical transceiver according to the second embodiment. FIG. 13 is a description diagram (part 2) illustrating one example of the manufacturing process of the optical transceiver according to the second embodiment. As illustrated in FIG. 12, first, (1) overlay the lens sheet 120 on the waveguide member 130. At this time, the optical path K is secured by the lens portion 120a being opposite the mirror 131.

Next, (2) inject the light-transmissive resin 127b into the first gap 128a and the second gap 128b. At this time, the light-transmissive resin 127b is injected from one side in the same direction as the longitudinal direction of the ellipse (direction of the minor axis projection plane) of the standoff 120b. Accordingly, the light-transmissive resin 127b is able to be injected in a streamlined manner, and the light-transmissive resin 127b is able to be efficiently injected since the light-transmissive resin 127b efficiently flows. Specifically, the light-transmissive resin 127b is able to easily detour around the rear side (opposite side in the injecting direction) of each standoff 120b to flow into the second gap 128b.

In addition, in injecting the light-transmissive resin 127b, the light-transmissive resin 127b is injected while the opening 128k is disposed on a side of the lens sheet 120 that is opposite the side from which the light-transmissive resin 127b is injected. For this reason, the light-transmissive resin 127b is able to be injected without gaps, and occurrence of voids is able to be suppressed.

The resin injected into the second gap 128b is not limited to the light-transmissive resin 127b. Resins not having transmissivity may be also used provided that the resin is a liquid-state adhesive resin that is able to bond the lens sheet 120 and the waveguide member 130. Specifically, the first gap 128a may be filled with the light-transmissive resin 127b, and the second gap 128b may be filled with resin (adhesive) that does not have light transmissivity since light is not transmitted in the second gap 128b. In addition, even voids occurring in the second gap 128b do not intervene on the optical path K. However, it is better for voids to not occur in the second gap 128b from the perspective of increasing the adhesion strength between the lens sheet 120 and the waveguide member 130.

Next, as illustrated in FIG. 13, (3) cure the light-transmissive resin 127b by UV radiation or by heating depending on the type of the light-transmissive resin 127b used. Then, (4) attach the board adhesive sheet 125 to the upper surface of the lens sheet 120. At this time, the board adhesive sheet 125 is not attached to the area around the lens portion 120a to secure the optical path K. Next, (5) bond the optical board 103 to the forming body by attaching the optical board 103 to the board adhesive sheet 125. Accordingly, the optical transceiver 100 according to the second embodiment is able to be manufactured.

In the second embodiment, the standoff 120b is integrated with the lens sheet 120 but may be also integrated with the waveguide member 130 or may be disposed on another member other than the lens sheet 120 and the waveguide member 130. In addition, the shape of the standoff 120b is not limited to an elliptic cylinder shape but may be other shapes such as a square pillar shape.

In addition, the relationship between the thickness of the adhesive sheet 127a and filling failure of the light-transmissive resin 127b illustrated in FIG. 7 may be represented as the relationship between the height of the standoff 120b and filling failure of the light-transmissive resin 127b in the second embodiment. Specifically, the failure rate is 0% when the height of the standoff 120b is 20 µm, 25 µm, 35 µm, or 50 µm. That is, voids do not occur in all the manufactured optical transceivers 100.

As described above, the optical transceiver 100 according to the second embodiment is able to suppress occurrence of voids by injecting the light-transmissive resin 127b alike the first embodiment. In addition, the thickness of the bonding layer 127 is able to be set to the allowable thickness in the design by the standoff 120b. Accordingly, the position of the focal point is able to be set to the same position as that of the focal point 800 in the design (refer to FIG. 8). Therefore, optical loss is able to be suppressed.

Modification Example of Second Embodiment

Figure 14:
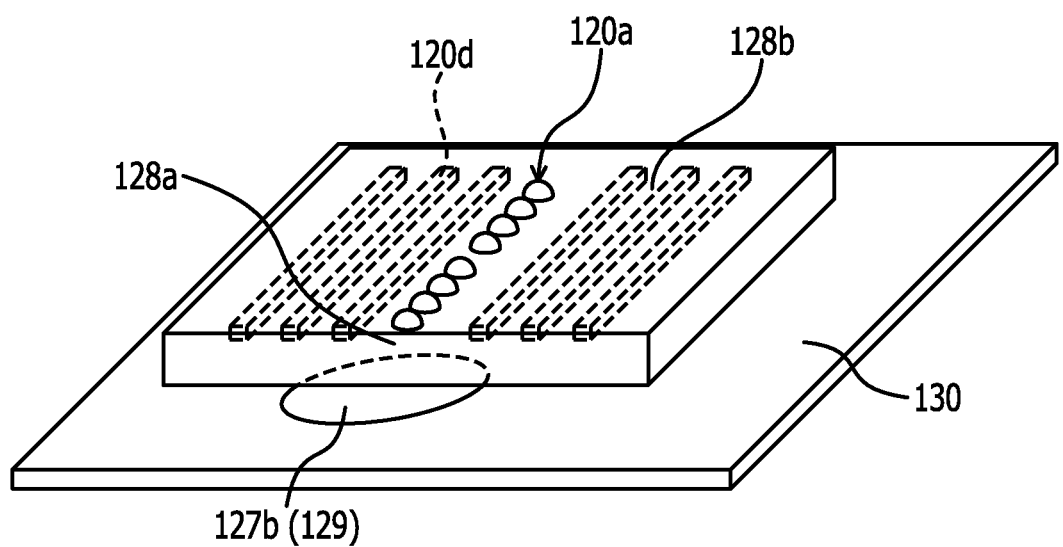
FIG. 14 is a description diagram illustrating a modification example of the second embodiment.

FIG. 14 is a description diagram illustrating a modification example of the second embodiment. The modification example illustrated in FIG. 14 differs from the second embodiment in that the plurality of standoffs (interposed members) is not configured to be scattered, but linear standoffs that line up and extend from the side from which the light-transmissive resin 127b is injected into the opposite side are used.

In FIG. 14, a standoff 120d, for example, is plurally formed on a side of the lens sheet 120 that is opposite the side where the lens portion 120a is formed. The plurality of standoffs 120d is linearly formed, lines up, and extends from the injecting side to the opposite side and is separately arranged while the longitudinal direction thereof is aligned to one direction. Each standoff 120d has a uniform thickness.

The light-transmissive resin 127b is suitably injected from one side in the same direction as the longitudinal direction of the standoff 120d when injecting the light-transmissive resin 127b into the first gap 128a and the second gap 128b. In such a configuration, also, the light-transmissive resin 127b is able to be injected into the first gap 128a and the second gap 128b, and occurrence of voids is able to be suppressed.

In addition, like in the second embodiment, the consistent distance (thickness) between the lens sheet 120 and the waveguide member 130 is able to be secured, and change in the position of the focal point is able to be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical module comprising:
an optical waveguide to transport light, the optical waveguide including a first mirror to reflect first light;

an adhesive sheet formed over the optical waveguide, the adhesive sheet including a first gap above the first mirror, the adhesive sheet being formed in advance to have a uniform thickness;

a first light-transmissive layer formed in the first gap;

a lens sheet arranged over the adhesive sheet, the lens sheet including a first lens which is formed above the first mirror; and a light-emitting device formed above the lens sheet, the light-emitting device including a light-emitting portion which emits the first light to the first lens.

2. The optical module according to claim 1, further comprising:

a second mirror, to reflect second light, formed in the optical waveguide;

a second gap formed in the adhesive sheet above the second mirror;

a second light-transmissive layer formed in the second gap;

a second lens formed in the lens sheet above the second light-transmissive layer; and a light-receiving device formed above the lens sheet, the light-receiving device including a light-receiving portion to receive the second light transmitted through the second lens.

3. The optical module according to claim 1, wherein the adhesive sheet bonds the lens sheet and the optical waveguide by an adhesive surface being cured by heating.

4. The optical module according to claim 1, wherein the adhesive sheet bonds the lens sheet and the optical waveguide by an adhesive surface being cured by ultraviolet radiation.

5. The optical module according to claim 1, wherein the first light-transmissive layer is a resin that is cured by heating.

6. The optical module according to claim 1, wherein the first light-transmissive layer is a resin that is cured by ultraviolet radiation.

7. A method for manufacturing an optical module comprising:

forming a first mirror on an optical waveguide by notching the optical waveguide;

forming an adhesive sheet to have a uniform thickness in advance;

forming a first gap in the adhesive sheet;

attaching the adhesive sheet onto the optical waveguide so that the first gap is at a position over the first mirror;

attaching a lens sheet that includes a first lens above the position where the first gap is formed onto the adhesive sheet; and filling the first gap with a light-transmissive resin.

8. The method for manufacturing an optical module according to claim 7, further comprising:

curing the light-transmissive resin by radiating ultraviolet ray above the lens sheet.

9. An optical transceiver comprising:

an optical waveguide to transport light, the optical waveguide including
a first mirror to reflect first light, and
a second mirror to reflect second light;

an adhesive sheet formed on the optical waveguide, the adhesive sheet being formed in advance to have a uniform thickness and the adhesive sheet including
a first gap above the first mirror, and
a second gap above the second mirror;

a first light-transmissive layer formed in the first gap;

a second light-transmissive layer formed in the second gap;

a lens sheet arranged over the adhesive sheet, the lens sheet including
a first lens which is formed above the first mirror, and
a second lens which is formed above the second mirror;

a light-emitting device formed above the lens sheet, the light-emitting device including a light-emitting portion to emit the first light to the first lens;

a light-receiving device formed above the lens sheet, the light-receiving device including a light-receiving portion to receive the second light transmitted through the second lens;

a controller supplies a drive current to the light-emitting device; and an amplifier converts a current signal which is photoelectrically converted by the light-receiving device into a voltage signal.

* * * * *